(12) United States Patent
Barrass

(10) Patent No.: US 8,787,402 B2
(45) Date of Patent: *Jul. 22, 2014

(54) SYSTEMS AND METHODS TO CONTROL FLOW AND TO DEFINE AND INTERLEAVE MULTIPLE CHANNELS

(75) Inventor: Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/600,095

(22) Filed: Aug. 30, 2012

(65) Prior Publication Data

US 2012/0320915 A1 Dec. 20, 2012

Related U.S. Application Data

(63) Continuation of application No. 11/459,348, filed on Jul. 22, 2006, now Pat. No. 8,259,748.

(51) Int. Cl.
*H04L 12/66* (2006.01)
*H04L 29/10* (2006.01)
*H04L 29/08* (2006.01)

(52) U.S. Cl.
CPC .......... *H04L 29/10* (2013.01); *H04L 29/08027* (2013.01); *H04L 29/08018* (2013.01); *H04L 29/08009* (2013.01)
USPC ....................................... 370/463

(58) Field of Classification Search
CPC ...................................... H04L 29/10
See application file for complete search history.

(56) References Cited

U.S. PATENT DOCUMENTS

| | | | |
|---|---|---|---|
| 5,953,345 A | | 9/1999 | Findlater et al. |
| 6,069,897 A | * | 5/2000 | Perlman et al. ............... 370/420 |
| 6,385,208 B1 | | 5/2002 | Findlater et al. |

(Continued)

FOREIGN PATENT DOCUMENTS

| | | |
|---|---|---|
| CN | 1522522 | 8/2004 |
| CN | 101473617 B | 8/2013 |
| WO | WO-2008014145 A2 | 1/2008 |
| WO | WO-2008014145 A3 | 1/2008 |

OTHER PUBLICATIONS

"Chinese Application Serial No. 200780023041.0, Notice of Decision to Grant mailed May 6, 2013", with English translation, 3 pgs.

(Continued)

*Primary Examiner* — Timothy J Weidner
(74) *Attorney, Agent, or Firm* — Schwegman Lundberg & Woessner, P.A.

(57) ABSTRACT

A transmitter transmits a data frame as an uninterrupted stream of codeblocks of predefined size on a first data path between a MAC and PHY. It inserts a first idle block of predefined size within the data frame if there is insufficient data. A receiver receives a second idle block on a second data path, the second idle block including a request to slow down the transmission on the first data path. The receiver causes the transmitter to insert a third idle block in response to receiving the second idle block. The transmitter may further send a stream identifier including an identifier for a data stream and a bandwidth factor. The transmitter may send one codeblock chosen from data blocks for the data stream and idle blocks, and then send the bandwidth factor number of codeblocks chosen from data blocks for other data streams and idle blocks.

16 Claims, 2 Drawing Sheets

(56) References Cited

U.S. PATENT DOCUMENTS

| | | | |
|---|---|---|---|
| 6,631,138 B1 | 10/2003 | Findlater et al. | |
| 6,741,566 B1 | 5/2004 | Furlong et al. | |
| 6,816,505 B1 | 11/2004 | Sutardja et al. | |
| 6,980,563 B2 | 12/2005 | Barker et al. | |
| 7,031,258 B1 | 4/2006 | Frisch et al. | |
| 7,031,333 B1 | 4/2006 | Findlater et al. | |
| 7,177,325 B2 | 2/2007 | Claseman | |
| 7,257,129 B2 | 8/2007 | Lee et al. | |
| 7,418,514 B1 | 8/2008 | Lo et al. | |
| 7,664,134 B2 | 2/2010 | Caldwell et al. | |
| 7,672,300 B1 * | 3/2010 | Medina et al. | 370/366 |
| 7,719,970 B1 | 5/2010 | Dada et al. | |
| 8,259,748 B2 * | 9/2012 | Barrass | 370/463 |
| 2001/0014104 A1 | 8/2001 | Bottorff et al. | |
| 2001/0043603 A1 * | 11/2001 | Yu | 370/393 |
| 2002/0126684 A1 | 9/2002 | Findlater et al. | |
| 2002/0191603 A1 | 12/2002 | Shin et al. | |
| 2003/0088726 A1 * | 5/2003 | Dillabough et al. | 710/305 |
| 2003/0188026 A1 | 10/2003 | Denton et al. | |
| 2003/0217215 A1 | 11/2003 | Taborek et al. | |
| 2004/0022238 A1 | 2/2004 | Kimmitt | |
| 2004/0123190 A1 | 6/2004 | Toyida et al. | |
| 2004/0202198 A1 | 10/2004 | Walker et al. | |
| 2005/0019036 A1 | 1/2005 | Soto et al. | |
| 2005/0102419 A1 | 5/2005 | Popescu et al. | |
| 2005/0163149 A1 | 7/2005 | Unitt et al. | |
| 2005/0259685 A1 | 11/2005 | Chang et al. | |
| 2006/0109784 A1 | 5/2006 | Weller et al. | |
| 2006/0268938 A1 | 11/2006 | Terry | |
| 2007/0047572 A1 | 3/2007 | Desai et al. | |
| 2007/0110103 A1 | 5/2007 | Zimmerman et al. | |
| 2008/0019389 A1 | 1/2008 | Barrass | |

OTHER PUBLICATIONS

"Chinese Application Serial No. 200780023041.0, Office Action mailed Dec. 18, 2012", with English translation of claims, 11 pgs.
"Chinese Application Serial No. 200780023041.0, Response filed Mar. 1, 2013 to Office Action mailed Dec. 8, 2012", with English translation of claims, 5 pgs.
"European Application No. 07812999.6, Extended Search Report Report mailed Mar. 15, 2013", 8 pgs.
"IEEE Standard for Ethernet, IEEE Std. 802.3™-2012, Section 1", The Institute of Electrical and Electronics Engineers, Inc., (Dec. 28, 2012), 634 pgs.
"IEEE Standard for Ethernet, IEEE Std. 802.3™-2012, Section 2", The Institute of Electrical and Electronics Engineers, Inc., (Dec. 28, 2012), 780 pgs.
"IEEE Standard for Ethernet, IEEE Std. 802.3™-2012, Section 3", The Institute of Electrical and Electronics Engineers, Inc, (Dec. 28, 2012), 358 pgs.
"IEEE Standard for Ethernet, IEEE Std. 802.3™-2012, Section 4", The Institute of Electrical and Electronics Engineers, Inc., (Dec. 28, 2012), 732 pgs.
"IEEE Standard for Ethernet, IEEE Std. 802.3™-2012, Section 5", The Institute of Electrical and Electronics Engineers, Inc., (Dec. 28, 2012), 844 pgs.
"IEEE Standard for Ethernet, IEEE Std. 802.3™-2012, Section 6", The Institute of Electrical and Electronics Engineers, Inc, (Dec. 28, 2012), 400 pgs.
"IEEE Standard for Information technology—Telecommunication and Information exchange between systems—Local and metroplitan area networks—Specific requirements", (Jan. 1, 2005), 1,2,153-176.

Frazier, Howard, "Comparison of Rate Control Methods", IEEE P802.3ae 10 Gigabit Ethernet Task Force, (May 24, 2000), 1-15.
"U.S. Appl. No. 11/459,348, Advisory Action mailed Jan. 12, 2011", 3 pgs.
"U.S. Appl. No. 11/459,348, Final Office Action mailed Aug. 17, 2009", 9 pgs.
"U.S. Appl. No. 11/459,348, Final Office Action mailed Oct. 21, 2010", 14 pgs.
"U.S. Appl. No. 11/459,348, Non Final Office Action mailed Jan. 26, 2009", 7 pgs.
"U.S. Appl. No. 11/459,348, Non-Final Office Action mailed Apr. 30, 2010", 12 pgs.
"U.S. Appl. No. 11/459,348, Notice of Allowance mailed May 7, 2012", 9 pgs.
"U.S. Appl. No. 11/459,348, Response filed Apr. 21, 2009 to Non Final Office Action mailed Jan. 26, 2009", 14 pgs.
"U.S. Appl. No. 11/459,348, Response filed Nov. 17, 2009 to Final Office Action mailed Aug. 17, 2009", 13 pgs.
"U.S. Appl. No. 11/459,348, Response filed Dec. 21, 2010 to Final Office Action mailed Oct. 21, 2010", 14 pgs.
"U.S. Appl. No. 11/459,348, Response filed Aug. 2, 2010 to Non Final Office Action mailed Apr. 30, 2010", 16 pgs.
"Chinese Application Serial No. 200780023041.0, Office Action mailed Dec. 14, 2010", 19 pgs.
"Chinese Application Serial No. 200780023041.0, Office Action mailed Apr. 6, 2012", With English Translation, 15 pgs.
"Chinese Application Serial No. 200780023041.0, Office Action mailed May 25, 2011", 9 pgs.
"Chinese Application Serial No. 200780023041.0, Response filed Apr. 25, 2011to Office Action mailed Dec. 14, 2010", 11 pgs.
"Chinese Application Serial No. 200780023041,0, Response filed Aug. 3, 2011 to Office Action mailed Jun. 24, 2011 to Office Action mailed May 25, 2011", 2 pgs.
"Chinese Application Serial No. 200780023041.0, Response filed Jun. 2, 2012 to Office Action mailed Apr. 6, 2012", 15 pgs.
"Fibre Channel—Physical and Signaling Interface (FC-PH)—Rev 4.3", Proposed Working Draft, American National Standard for Informations Systems, (Jun. 1, 1994), 478 p.
"Intel 82540EP Gigabit Ethernet Controller, Networking Silicon", Datasheet, Revision 1.5, (Nov. 2004).
"International Application Serial No. PCT/US2007/073655, International Preliminary Report on Patentability mailed Jan. 27, 2009", 5 pgs.
"International Application Serial No. PCT/US2007/073655, Written Opinion mailed Feb. 1, 2008", 4 pgs.
"Telecommunications and information exchange between systems, local and metropolitan networks, Specific Requirements, Part 3: Carrier Sense multiple access with collision detection (CSMA/CD) access method and physical layer specifications", IEEE Standard for Information Technology, IEEE New York, NY, IEEE Std 802.3 2005 (Revision of IEEE Std. 802.3-2002), (Dec. 12, 2005).
Brand, Richard, "10 Gigabit Ethernet Interconnection with Wide Area Networks", Version 1, www.10gea.org, (Mar. 2002).
Muller, S., et al., "Proposal for an Open Loop PHY Rate Control Mechanism", Presentation, IEEE 802.3ae 10Gb/s Task Force, May 2000 Interim meeting, Ottawa, ON, (May 2000), 11 pgs.
Zeile, M., "An Efficient Interconnect for Advanced Mezzanine Cards", Fulcrum Microsystems, www.fulcrummicro.com, (Oct. 2004).
European Application Serial No. 07812999.6, Examination Notification Art. 94(3) mailed Feb. 21, 2014, 5 pgs.

* cited by examiner

SYSTEMS AND METHODS TO CONTROL FLOW AND TO DEFINE AND INTERLEAVE MULTIPLE CHANNELS

RELATED APPLICATION

This application is a continuation application that claims the priority benefit of U.S. application Ser. No. 11/459,348 filed Jul. 22, 2006 which application is incorporated herein by reference in its entirety.

BACKGROUND

1. Field of the Invention

The present invention relates generally to a system and method for providing an interface between an Ethernet physical media interface (PHY) and a Media Access Controller (MAC). More specifically, the present invention relates to an interface that accommodates a PHY with a lower data rate than the MAC.

2. Relationship to the Related Art

In computer network systems there is typically a natural division between chips handling the physical layer, which is responsible for transmitting data on the network, and the system chips, which perform logical operations with data transmitted on the network. Ethernet hubs, routers and switches are composed of multiple ports, and may be generically referred to as multi-port Ethernet devices. Each port is typically composed of a system chip, which includes a media access controller ("MAC") layer, and a physical layer or "PHY." Modern multi-port Ethernet devices typically integrate multiple MACs into one system chip (MAC chip) as well as multiple PHYs into another chip (PHY chip). An interface is required on each chip to transfer signals between the MACs and the PHYs.

IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, IEEE Std 802.3™-2005, provides a standard for Ethernet local area network operation including interfaces between the MACs and the PHYs.

Section 4 of Part 3 of IEEE Std 802.3™-2005 provides for a 10 Gigabit/second (Gb/s) baseband network and connection of a 10 Gb/s capable MAC to a 10 Gb/s PHY. Interfaces that can connect a 10 Gb/s capable MAC to a 10 Gb/s PHY include 10 Gigabit Media Independent Interface (XGMII), 10 Gigabit Attachment Unit Interface (XAUI), 10 Gigabit Sixteen-Bit Interface (XSBI), and the high speed serial electrical interface for 10 Gb/s small form-factor pluggable transceiver (XFP) modules (XFI).

FIG. 4 is a block diagram illustrating a MAC to PHY interface according to IEEE Std 802.3™-2005 in relation to the OSI Reference Model Layers 400. The MAC 410 is part of the data link layer 402. The PHY 420 is part of the physical layer 404. The interface 430 between the MAC 410 and the PHY 420 is also part of the physical layer 404.

Various 10 Gigabit/second interfaces may be used between the MAC 410 and the PHY 420. For example, a 10 Gigabit Interface Media Independent Interface (XGMII) in which each sixty-four bit block consists of two consecutive sets of thirty-two data bits with a corresponding 4 bits of controls may be used. The thirty-two data bits and 4 control bits are communicated over 4 lanes in which each lanes carries an octet of data and an associated control bit. 4 lanes are provided for data to be transmitted on the attached media. An independent 4 lanes are provided for data received on the attached media.

Another interface that may be used between the MAC 410 and the PHY 420 is a 10 Gigabit Attachment Unit Interface (XAUI) in which each sixty-four bit block consists of two consecutive sets of four 8B/10B codewords, 8 bits of data and 2 control bits. Still another interface that may be used between the MAC 410 and the PHY 420 is a high speed serial electrical interface for 10 Gb/s small form-factor pluggable transceiver (XFP) modules (XFI) in which each sixty-four bit block consists of one 64B/66B codeword, 64 bits of data and 2 control bits.

10 Gb/s communication between the MAC 410 and the PHY 420 is specified as operating at a fixed clock frequency corresponding to the nominal 10 Gb/s bit rate. Independent transmit and receive data paths are provided between the MAC 410 and the PHY 420. Data is communicated in data frames that begin with a preamble <preamble> and start of frame delimiter <sfd> and end with an end of frame delimiter <efd>. Data within each data frame is communicated in 64 bit code blocks. An inter-frame <inter-frame> period during which no frame data activity occurs separates successive data frames. The inter-frame period can vary in length.

PHYs connected to a 10 Gb/s capable MAC may be required to support the 10 Gb/s MAC data rate. A PHY that is connected to physical media that provides less than a 10 Gb/s data rate may be required to use inter-frame period idle control characters to compensate for the difference in data rates, such as in the mechanism provided by Section 46.1.3, Rate of Operation, of IEEE Std 802.3™-2005 for XGMII. The PHY may buffer one complete frame of incoming data to transmit a data frame to the MAC at the 10 Gb/s MAC data rate. The PHY may buffer more than one complete frame of outgoing data received from the MAC at the 10 Gb/s MAC data rate. A data frame may be up to sixteen kilobytes of data for Ethernet systems. Thus a PHY that is connected to physical media that provides less than a 10 Gb/s data rate may need a significant amount of buffer memory.

In view of the foregoing, it would be useful if the buffer memory requirements could be reduced for a PHY that is connected to physical media that provides less than a 10 Gb/s data rate.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Reference will now he made in detail to various embodiments of the invention. Examples of these embodiments are illustrated in the accompanying drawings. While the invention will be described in conjunction with these embodiments, it will be understood that they are not intended to limit the invention to any particular embodiments. On the contrary, they are intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
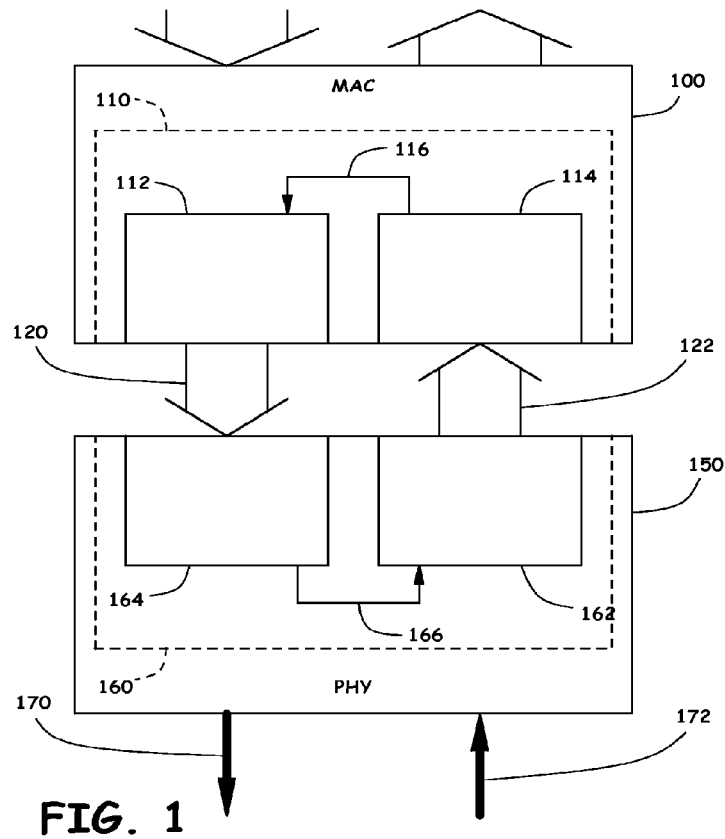
FIG. 1 is a block diagram of a MAC to PHY interface.
Figure 4:
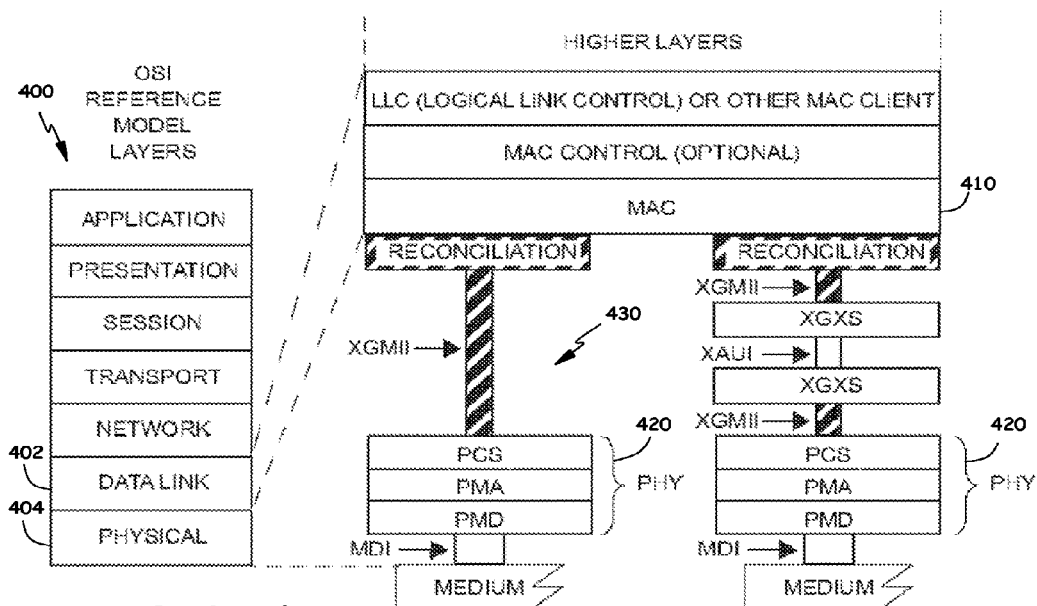
FIG. 4 is a block diagram illustrating a MAC to PHY interface in relation to the OSI Reference Model Layers.

FIG. 1 is block diagram of a device 110 for transmitting data between a media access controller (MAC) 100 and a physical layer (PHY) 150. The 110 device includes a transmitter 112 that transmits a data frame as an uninterrupted stream of codeblocks of a predefined size on a first 10 Gigabit/second data path 120 between the MAC 100 and the PRY 150. The term 10 Gigabit/second data path is used herein to mean a data path that is compliant with IEEE Std 802.3™-2005. Such a 10 Gigabit/second data path 120 may be provided by a 10 Gigabit Interface Media Independent Interface (XGMII), a 10 Gigabit Attachment Unit Interface (XAUI), a high speed serial electrical interface for 10 Gb/s small form-factor pluggable transceiver (XFP) modules (XFI), and by other interfaces that are compliant with IEEE Std 802.3™-2005.

It is a requirement of IEEE Std 802.3™-2005 that the data interfaces operate at a fixed clock frequency corresponding to the nominal 10 Gb/s bit rate, where the exact clock frequencies are a function of the interfaces as provided by the standard. Further, it is required that data be transferred in an uninterrupted stream of codeblocks. The codeblocks have a predefined sized for and given interface. For example, for the 10 Gigabit Interface Media Independent Interface (XGMII) each codeblock consists of two consecutive sets of thirty-two data bits with corresponding controls. For the 10 Gigabit Attachment Unit Interface (XAUI), each codeblock consists of two consecutive sets of four 8B/10B codewords. For the high speed serial electrical interface for 10 Gb/s small form-factor pluggable transceiver (XFP) modules (XFI), and each codeblock consists of one 64B/66B codeword. In all cases the codeblock include 64 data bits that may represent eight data octets as specified by IEEE Std 802.3™-2005. The codeblocks further include control bits as determined by the interface in use.

It is important that the clock frequency be fixed and that the transfer of codeblocks be uninterrupted so that data transfers can be reliably carried out at the 10 Gb/s bit rate. Rather than buffer a full data frame before transmitting as would be required to fully comply with IEEE Std 802.3™-2005, the transmitter 112 according to the present invention inserts an idle block of the same predefined size as the codeblocks that carry data within the data frame if there is insufficient data. Idle blocks may include characters chosen from the set of control characters that are undefined, and hence invalid, by IEEE Std 802.3™-2005. For example, the idle block may be of the form:

SyncOb10; Control type 0x1e; 7x Idle 0x00
i.e. 0x2_1E00_0000_0000_0000

The idle block is an invalid codeblock in a normal data stream according to IEEE Std 802.3™-2005. The idle blocks inserted into the data frame by the transmitter 112 of the source device 110 must be removed by the receiver 164 of the destination device 160 fir the stream provided by the first data path 120 to appear normal.

It will be appreciated that the MAC 100 and PHY 150 form a symmetrical system in which the PHY may use a device 160 that is similar to the device 110 used by the PHY to transmit data. The device 160 in the PHY 150 may use the same mechanism as described above to insert idle block within the data frame if there is insufficient data. This may be advantageous if the PHY 150 is receiving data from media 172 that does not provide data at a 10 Gb/s rate either because it is legacy media or because it is operating at less than the intended speed, perhaps due to deficiencies in the media.

It may be noted that the data flowing through the MAC 100 and the PHY 150 may be described as transmit data or receive data based on whether it is transmitted or received on the media connected to the PHY. Thus the transmitter 112 of the MAC 100 transfers transmit data that is received by the receiver 164 of the PHY 150 for transmission on the outbound media 170. The inbound media 172 provides receive data that the transmitter 162 of the PHY 150 transfers to the receiver 114 of the MAC 100.

The device 110 may further include a receiver 114 coupled 116 to the transmitter 112 and to a second 10 Gigabit/second data path 122 between the MAC 100 and the PRY 150. The second data path 122 transferring data in an opposite direction from the first data path 120.

For the MAC 100, the first data path 120 carries the transmit data destined for the outbound media 170 and the second data path 122 carries the receive data from the inbound media 172. For the PHY 150, the first data path 122 carries the receive data from the inbound media 172 and the second data path 122 carries the transmit data destined for the outbound media 170. Note that the term first data path and second data path are applied with respect to the transmitter and receiver respectively of the device being described. The first data path 120 for the device 110 on the MAC 100 is also the second data path 120 for the device 160 on the PHY 150.

The receiver 114 of the device 110 may receive a second idle block on the second data path 122. The second idle block may include a request to slow down the transmission on the first data path 120. Idle blocks with a slow down request may include characters chosen from the set of control characters that are undefined, and hence invalid, by IEEE Std 802.3™-2005. For example, the idle block may be of the form:

SyncOb10; Control type 0x55; 7x Idle 0x00
i.e. 0x2_5500_0000_0000_0000

If the receiver 114 receives the idle block with a slow down request on the second data path 122, the receiver signals the transmitter 112 of the same device 110 to insert an idle block in the data frame being transmitted on the first data path 120. The transmitter 112 responds to the signal 116 by inserting one or more idle blocks in the data frame. The idle block, inserted by the transmitter 112 of the first device 110 may or may not include a request to slow the data being transmitted by the second device 160. That is, both the MAC and the PHY can send idles with a slowdown request and independently slow the effective data transfer rate in both directions. It will be appreciated that if the transmitter 112 is not transmitting a data frame when it receives the signal 116 requesting a slow down, it responds by continuing to send the idle blocks normally sent during the inter-frame period as called for by IEEE Std 802.3™-2005.

The receiver 112 may respond to the signal 116 by inserting two idle blocks in the data frame. Thus two idle blocks are transmitted when one request to slow down the transmission is received. This permits the sending device 160 to completely halt the sending of data to its receiver 164 while permitting its transmitter 162 to send data in every other codeblock.

The receiver is required to respond to the signal requesting insertion of idle blocks within a predefined period of time after the receiver receives the request to slow down the transmission. The predefined period may be 384 bit times or the time required to send six codeblocks using XGMII. This predefined period establishes the size of buffer required to accommodate characters received until the slowdown request is honored.

The facility provided by the idle blocks with a slow down request may be extended to provide support for multiple sub-rate streams using a 10 Gb/s single data path. The special idle block may also include a stream identifier and a bandwidth factor. The stream identifier may be an eight bit identifier containing a unique number associated with a data stream. The stream identifier may be limited to a range of values such as 1 through 127. The bandwidth factor may be an eight bit ratio number representing the number of idles blocks for every data block. For example, the idle block with a slow down request for stream 1 with a 1:10 bandwidth factor (1 data block and 9 idle blocks) may take this form:

Sync Ob10; Control type 0x55; (ident); (ratio); 0xES;
O–code=0; O–code=0; (ident); (ratio); 0xD5
i.e. 0x2_5501_09D5_0001_09E5

It may be noted that a bandwidth factor of 0 means that a single stream uses all available bandwidth to provide a 10 Gb/s stream. The stream identifier can be ignored for a single stream. Thus the example of an idle blocks with a slow down request is a special case of the idle blocks with a slow down request given here.

The idle block with stream identifier and bandwidth ratio, hereafter stream identifier block, according to the present invention is sent during the inter-frame period. At least one stream identifier block may be required to be sent in each inter-frame period. A stream identifier block may be required to be sent periodically during long inter-frame periods, such as at least once for every 128 idle blocks sent.

Additional streams can be defined so that they send data at the times the previously defined streams have defined as being filled with idle blocks. When multiple streams are defined, an "idle block" can be a data block for another stream.

When the available bandwidth is divided into multiple streams by stream identifier blocks, each stream represents an independent data transmission. Each stream will have data frames and inter-frame periods that are not aligned with other streams.

When multiple streams have been defined, the transmitter 112 sends one codeblock chosen from a group consisting of data blocks for the data stream and idle blocks. The transmitter then sends the bandwidth factor number of codeblocks chosen from a group consisting of data blocks for other data streams and idle blocks. It will be appreciated that the mechanisms of inserting an idle block within the data frame if there is insufficient data and in response to idle blocks including a request to slow down may be used with multiple streams.

Figure 2:
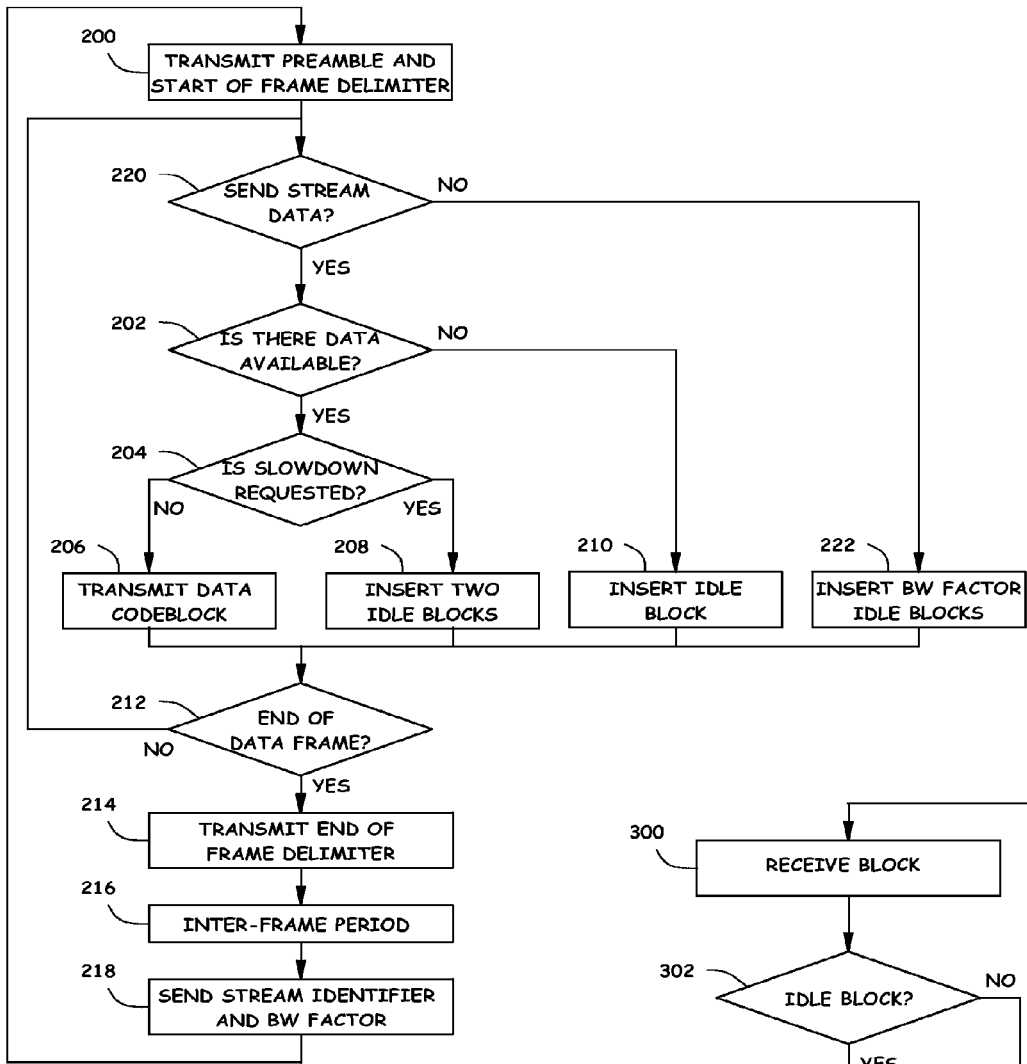
FIG. 2 is a flowchart of a method of transferring data between a MAC and a PHY by a transmitting device.

FIG. 2 is a flowchart for a method of transmitting data between a media access controller (MAC) 100 and a physical layer (PHY) 150 by a transmitter 112. Transmitting a data frame is begun by transmitting a preamble and start of frame delimiter 200. The data is transmitted as an uninterrupted stream of codeblocks 206 of a predefined size on a first 10 Gigabit/second data path between the MAC and the PHY. If there is insufficient data 202—No a first idle block of the predefined size is inserted 210 within the data frame.

If a second idle block including a request to slow down the transmission on the first data path is received 204—Yes on a second 10 Gigabit/second data path between the MAC and the PHY, a third and fourth idle blocks are inserted 208 in the data frame in response to receiving the second idle block, such that two idle blocks are transmitted when one request to slow down the transmission is received. The two idle blocks are transmitted within a predefined period of time after receiving the request 204 to slow down the transmission.

The method may provide for sharing a data interface amongst several streams of data by sending a stream identifier block 218 during an inter-frame period between successive data frames. The stream identifier block includes an identifier for a data stream having a net data rate of less than 10 Gigabit/second and a bandwidth factor that indicates a number of codeblocks that will be sent between successive data blocks for the data stream.

Transmitting data in the data frame between the MAC and the PHY for the stream occurs in selected codeblocks 220 as determined by the bandwidth factor. When the stream is designated to send one codeblock 220—Yes, a codeblock is chosen for sending from a group consisting of data blocks for the data stream 206 and idle blocks 208, 210. When the stream is not designated to send a codeblock 220—No, the bandwidth factor number of codeblocks 222 chosen from a group consisting of data blocks for other data streams and idle blocks are sent. Data blocks for other data streams may be considered idle blocks for this stream.

Figure 3:
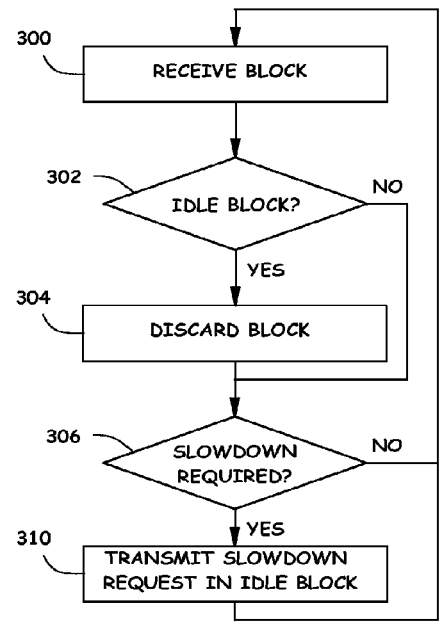
FIG. 3 is a flowchart of a method of receiving data by a receiving device.

FIG. 3 is a flowchart for a method of slowing the transmission of data between the MAC 100 and the PHY 150 by a receiving device 160 that is receiving data from the transmitter 112 of the transmitting device 110 transmitting data by the method illustrated by FIG. 2. The receiver 164 of the receiving device 160 receives a block 300. If the received block is an idle block 302—Yes, the block is discarded 304. Otherwise 302—No, the block is accepted as a codeblock.

If the receiving device 160 determines that a slowdown of the transmission of data by the transmitter 112 is required 306—Yes, the transmitter 164 of the receiving device 160 inserts an idle block with a slowdown request 308 in the data stream being sent to the receiver 114 of the transmitting device 110. If a slowdown is not required 306—No or after a slowdown request is inserted 308, the receiving device 160 continues to receive additional blocks 300.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A device for transmitting data between a media access controller (MAC) and a physical layer (PHY), the device comprising:
   a transmitter that is part of the MAC and that transmits a data frame from the MAC as an uninterrupted stream of codeblocks of a predefined size on a first data path between the MAC and the PHY, the data frame transmitted from the MAC as the uninterrupted stream of codeblocks by insertion of a first idle block within the data frame if there is insufficient data, idle blocks being of the predefined size and including only characters chosen from a set of control characters that are undefined such that idle blocks are invalid codeblocks.

2. The device of claim 1 further comprising a receiver coupled to the transmitter and to a second data path between the MAC and the PHY, the second data path transferring data in an opposite direction from the first data path, the receiver
   to receive a second idle block on the second data path, the second idle block including a request to slow down the transmission on the first data path, and to cause the transmitter to insert a third idle block in the data frame in response to receiving the second idle block.

3. The device of claim 2 wherein the receiver causes the transmitter to insert a fourth idle block in the data frame if the request to slow down the transmission is received, such that two idle blocks are transmitted when one request to slow down the transmission is received.

4. The device of claim 3 wherein the transmitter transmits the two idle blocks within a predefined period of time after the receiver receives the request to slow down the transmission.

5. The device of claim 2 wherein the second data path is a 10 Gigabit Attachment Unit Interface (XAUI), and each codeblock consists of two consecutive sets of four 8B/10B codewords.

6. The device of claim 2 wherein the second data path is a 10 Gigabit Interface Media Independent Interface (XGMII), and each codeblock consists of two consecutive sets of thirty-two data bits with corresponding controls.

7. The device of claim 2 wherein the second data path is a high speed serial electrical interface for 10 Gb/s small form-factor pluggable transceiver (XFP) modules (XFI), and each codeblock consists of one 64B/66B codeword.

8. The device of claim 1 wherein the transmitter further:
sends a stream identifier block during an inter-frame period between successive data frames, the stream identifier block including an identifier for a data stream having a net data rate of less than 10 Gigabit/second and a bandwidth factor that indicates a number of codeblocks that will be sent between successive data blocks for the data stream;
sends one codeblock chosen from a group consisting of data blocks for the data stream and idle blocks; and
sends the bandwidth factor number of codeblocks chosen from a group consisting of data blocks for other data streams and idle blocks.

9. A method of transmitting data between a media access controller (MAC) and a physical layer (PHY), the method comprising:
transmitting, from a transmitter that is part of the MAC a data frame from the MAC as an uninterrupted stream of codeblocks of a predefined size on a first data path between the MAC and the PHY, the transmitting from the MAC including inserting a first idle block within the data frame if there is insufficient data, idle blocks being of the predefined size and including only characters chosen from a set of control characters that are undefined such that idle blocks are invalid codeblocks.

10. The method of claim 9 further comprising:
receiving a second idle block on a second data path between the MAC and the PHY, the second data path transferring data in an opposite direction from the first data path, the second idle block including a request to slow down the transmission on the first data path; and
inserting a third idle block in the data frame in response to receiving the second idle block.

11. The method of claim 10 further comprising inserting a fourth idle block in the data frame if the request to slow down the transmission is received, such that two idle blocks are transmitted when one request to slow down the transmission is received.

12. The method of claim 11 wherein the two idle blocks are transmitted within a predefined period of time after receiving the request to slow down the transmission.

13. The method of claim 10 wherein the second data path is a 10 Gigabit Attachment Unit Interface (XAUI), and each codeblock consists of two consecutive sets of four 8B/10B codewords.

14. The method of claim 10 wherein the second data path is a 10 Gigabit Interface Media Independent Interface (XGMII), and each codeblock consists of two consecutive sets of thirty-two data bits with corresponding controls.

15. The method of claim 10 wherein the second data path is a high speed serial electrical interface for 10 Gb/s small form-factor pluggable transceiver (XFP) modules (XFI), and each codeblock consists of one 64B/66B codeword.

16. The method of claim 9 further comprising:
sending a stream identifier block during an inter-frame period between successive data frames, the stream identifier block including an identifier for a data stream having a net data rate of less than 10 Gigabit/second and a bandwidth factor that indicates a number of codeblocks that will be sent between successive data blocks for the data stream;
wherein transmitting data in the data frame between the MAC and the PHY includes
sending one codeblock chosen from a group consisting of data blocks for the data stream and idle blocks, and
sending the bandwidth factor number of codeblocks chosen from a group consisting of data blocks for other data streams and idle blocks.

\* \* \* \* \*